ns(12) United States Patent
Choung et al.

(10) Patent No.: US 9,280,242 B2
(45) Date of Patent: Mar. 8, 2016

(54) DISPLAY DEVICE INTEGRATED WITH TOUCH SCREEN PANEL

(71) Applicant: SAMSUNG DISPLAY CO., LTD., Yongin, Gyeonggi-Do (KR)

(72) Inventors: Ji-Young Choung, Yongin (KR); Sang-Hwan Cho, Yongin (KR)

(73) Assignee: Samsung Display Co., Ltd., Yongin-Si (KR)

(*) Notice: Subject to any disclaimer, the term of this patent is extended or adjusted under 35 U.S.C. 154(b) by 41 days.

(21) Appl. No.: 14/102,385

(22) Filed: Dec. 10, 2013

(65) Prior Publication Data
US 2015/0015532 A1  Jan. 15, 2015

(30) Foreign Application Priority Data
Jul. 10, 2013  (KR) .................. 10-2013-0080967

(51) Int. Cl.
G06F 3/045 (2006.01)
G06F 3/044 (2006.01)
G06F 3/041 (2006.01)

(52) U.S. Cl.
CPC .............. *G06F 3/044* (2013.01); *G06F 3/0412* (2013.01); *G06F 2203/04103* (2013.01); *G06F 2203/04112* (2013.01)

(58) Field of Classification Search
None
See application file for complete search history.

(56) References Cited

U.S. PATENT DOCUMENTS

| 6,876,018 | B2 | 4/2005 | Ko | |
| 2010/0007621 | A1* | 1/2010 | Kang | G06F 3/044 345/173 |
| 2014/0117330 | A1 | 5/2014 | Cho et al. | |
| 2014/0152580 | A1* | 6/2014 | Weaver | G06F 3/041 345/173 |

FOREIGN PATENT DOCUMENTS

| KR | 10-2010-0006987 A | 1/2010 |
| KR | 10-2010-0043938 A | 4/2010 |
| KR | 10-2011-0127429 A | 11/2011 |
| KR | 10-2014-0056498 | 5/2014 |

* cited by examiner

*Primary Examiner* — Joseph Feild
*Assistant Examiner* — Ifedayo Iluyomade
(74) *Attorney, Agent, or Firm* — Lewis Roca Rothgerber Christie LLP

(57) ABSTRACT

In a display device integrated with a touch screen panel, the display device has a plurality of pixels arranged therein. First sensing electrodes are formed on an upper surface of the display device. A first dielectric layer is formed on the first sensing electrodes. Second sensing electrodes and a plurality of second dummy patterns are formed on the first dielectric layer. The second sensing electrodes are arranged in a direction intersecting the first sensing electrodes, and the plurality of second dummy patterns are formed not to overlap with the second sensing electrodes. A second dielectric layer is formed on the second sensing electrodes and the second dummy patterns. In the display device, the first sensing electrodes, the second sensing electrodes and the second dummy patterns are formed of a metal material.

19 Claims, 5 Drawing Sheets

DISPLAY DEVICE INTEGRATED WITH TOUCH SCREEN PANEL

CROSS-REFERENCE TO RELATED APPLICATION

This application claims priority to and the benefit of Korean Patent Application No. 10-2013-0080967, filed on Jul. 10, 2013, in the Korean Intellectual Property Office, the content of which is incorporated herein by reference in its entirety.

BACKGROUND

1. Field

An aspect of the present invention relates to a display device, and more particularly, to a display device integrated with a touch screen panel.

2. Description of the Related Art

A touch screen panel is an input device that allows a user's instruction to be input by selecting an instruction content displayed on a screen of an image display device or the like with a user's hand or an object.

To this end, the touch screen panel is formed on a front face of the image display device to convert a contact position into an electrical signal. Here, the user's hand or object is directly in contact with the touch screen panel at the contact position. Accordingly, the instruction content selected at the contact position is input as an input signal to the image display device.

SUMMARY

According to embodiments of the present invention, a display device is integrated with a touch screen panel, in which a conductive pattern in a polarizing film layer formed on an upper surface of the display device is used as a sensing electrode of a touch sensor, and the polarizing film layer is integrally formed with the display device, so that it is possible to decrease the thickness of the display device and to improve the visibility of an image.

According to an embodiment of the present invention, a display device integrated with a touch screen panel includes: a plurality of pixels; a plurality of first sensing electrodes on an upper surface of the display device; a first dielectric layer on the plurality of first sensing electrodes; a plurality of second sensing electrodes and a plurality of second dummy patterns on the first dielectric layer, wherein the plurality of second sensing electrodes are arranged in a direction crossing (intersecting) the first sensing electrodes, and the plurality of second dummy patterns are formed not to overlap with the plurality of second sensing electrodes; and a second dielectric layer on the plurality of second sensing electrodes and the plurality of second dummy patterns, wherein the plurality of first sensing electrodes, the plurality of second sensing electrodes and the plurality of second dummy patterns each comprise a metal material.

The display device may further include a plurality of first dummy patterns on the upper surface of the display device not to overlap with the plurality of first sensing electrodes.

Each of the plurality of first sensing electrode may include a plurality of first sensing cells arranged along a first direction, and first connection patterns configured to electrically connect the first sensing cells to each other.

Each of the plurality of first connection pattern may include at least one metal line.

The plurality of first sensing cells and the plurality of first dummy patterns between the plurality of first sensing cells may be formed in a regular pattern to be close to each other.

The plurality of first sensing electrodes may be each formed to have a mesh shape not to overlap with the plurality of pixels. The plurality of first dummy patterns may include a same metal material (e.g., may be the same metal material) as the plurality of first sensing electrodes. The first dummy patterns may be each formed to have a mesh shape not to overlap with the plurality of pixels.

Each of the plurality of second sensing electrode may include a plurality of second sensing cells arranged along a second direction crossing the first direction, and second connection patterns configured to electrically connect the second sensing cells to each other. The plurality of second sensing cells may be each formed to have a filled rhombic surface shape.

The plurality of second sensing cells and the plurality of second dummy patterns formed in areas between the plurality of second sensing cells may be formed in a regular pattern to be close to each other.

The second sensing electrodes may have a transmittance of light emitted in the pixels of 40 to 60%.

A thickness of the second sensing electrode may be 3 to 20 nm.

The plurality of second dummy patterns may be each formed to have a mesh shape or filled rhombic surface shape.

The plurality of second dummy patterns may be formed to a same thickness as the plurality of second sensing electrodes. The plurality of second dummy patterns may be electrically connected to the respective plurality of first sensing electrodes formed in areas overlapped therewith.

The plurality of first sensing electrodes are electrically connected to the second dummy patterns through the plurality of first sensing cells. The plurality of second dummy patterns and the plurality of first sensing cells corresponding thereto (e.g. a second dummy pattern of the plurality of second dummy patterns and a corresponding first sensing cell of the plurality of first sensing cells) may be electrically connected through a via hole in a corresponding area of the first dielectric layer.

The display device may be an organic light emitting display device. The upper surface of the display device may be the upper surface of a thin film on the plurality of pixels.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
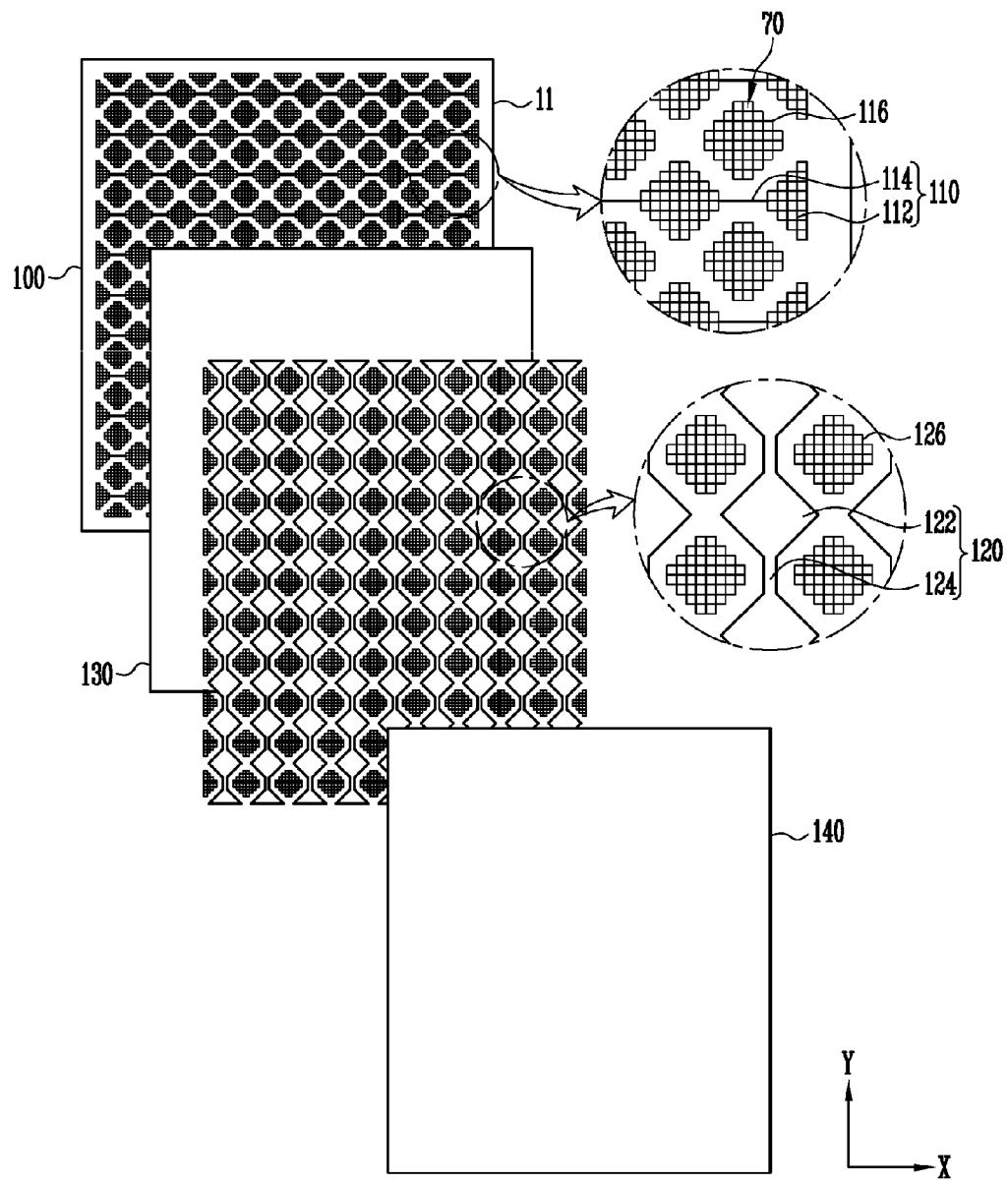
FIG. 1 is an exploded perspective view showing a display device integrated with a touch screen panel according to an embodiment of the present invention.

In the following detailed description, only certain example embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements. Expressions such as "at least one of," when preceding a list of elements, modify the entire list of elements and do not modify the individual elements of the list. Further, the use of "may" when describing embodiments of the present invention refers to "one or more embodiments of the present invention."

FIG. 1 is an exploded perspective view showing a display device integrated with a touch screen panel according to an embodiment of the present invention.

The touch screen panel according to this embodiment may be directly formed on one surface of the display device.

Here, the display device may be an organic light emitting display device, and accordingly, the touch screen panel may be directly formed on an upper surface of the organic light emitting display device.

The organic light emitting display device includes a lower substrate on which a plurality of pixels are arranged, and an upper substrate 100 configured to seal the lower substrate. The upper substrate 100 may be formed of a glass material or may be formed as a thin flexible film.

When the upper substrate 100 is formed as a thin film, the thin film may be formed into a structure in which at least one organic film layer and at least one inorganic film layer are sequentially stacked.

Here, the inorganic film layer performs a function of preventing external moisture and oxygen from penetrating into the organic light emitting diode included in each pixel, and the organic film layer performs a function of reducing the internal stress of the inorganic film layer and/or filling in micro-cracks or pin holes of the inorganic film layer.

In a comparable organic light emitting display device, a polarizing plate is necessarily attached on an outer surface of the organic light emitting display device, i.e., the outer surface of the upper substrate 100 in order to improve the external visibility by blocking the external light reflection. However, the touch screen panel according to this embodiment performs the polarization function of the polarizing plate, and thus by directly forming the touch screen panel on the upper substrate 100 with this polarizing function, a separate polarizing plate does not need to be attached on the upper substrate 100.

Hereinafter, the configuration of the touch screen panel according to this embodiment will be described in more detail.

Referring to FIG. 1, a plurality of first sensing electrodes 110 of the touch screen panel are formed on the upper surface of the display device, i.e., the upper surface of the upper substrate 100 of the display device, which is formed as a thin film or formed of a glass material.

That is, the first sensing electrode 110 is formed (in an elongated shape) along a first direction (e.g., an X-axis direction), so that a plurality of first sensing electrodes 110 can be arranged (to be spaced apart) along a second direction (e.g., a Y-axis direction) crossing (intersecting) the first direction.

The first sensing electrode 110 may include a plurality of first sensing cells 112 arranged along the first direction, and first connection patterns 114 configured to electrically connect the first sensing cells 112 to each other.

Here, the first sensing cell 112 may have a rhombic shape as shown in FIG. 1. Alternatively, however, the first sensing cell 112 may have various other suitable shapes such as a circular shape or a polygonal shape.

In this embodiment, the case where the first sensing cell 112 is formed in a rhombic shape is described as an example. When the first sensing cell 112 is formed in the rhombic shape, an empty space occurs (exists) between adjacent first sensing cells 112 (e.g., an empty space surrounded by four adjacent first sensing cells 112).

Accordingly, in this embodiment, a plurality of first dummy patterns 116 are formed in an area (the empty space) between the adjacent first sensing cells 112. As shown in FIG. 1, the first dummy patterns 116 are formed in the same shape as the first sensing cells 112.

Here, the first dummy patterns 116 are not electrically connected to each other. That is, a connection pattern is not formed between the first dummy patterns 116, and therefore, the first dummy patterns 116 are spaced apart from each other at a set or predetermined interval.

Thus, the first sensing cells 112 and the plurality of first dummy patterns 116 (formed in areas between the first sensing cells 112) are formed in a regular pattern to be close to each other on the upper substrate 100 of the display device.

In this embodiment, the first sensing electrodes 110 and the first dummy patterns 116 may be formed of an opaque metal material. Suitable material for the first sensing electrodes 110 and the first dummy patterns 116 may include one or more (e.g., two) alloys selected from Al, Ag, Mg, Cr, Ti, Ni, Au, Ta, Cu, Ca, Co, Fe, Mo, W, Pt and Yb, but the present invention is not limited thereto.

Conventionally, indium tin oxide (ITO) requiring a high-temperature process was used as the material for forming the sensing electrodes, and therefore, pixels positioned beneath the upper substrate were damaged during the forming of the sensing electrodes. However, in this embodiment, a process of forming the first sensing electrodes can be performed at a lower temperature, using a metal material to be subjected to low-temperature sintering, so that it is possible to reduce or prevent pixels from being damaged.

When the first sensing electrode 110 is formed of a metal having an electrical resistance relatively lower than that of the ITO, it is possible to reduce the RC (resistive-capacitive) delay.

Also, when the ITO is applied to a flexible touch screen panel, cracks easily occur in the flexible touch screen panel due to inefficient (or lack of) flexibility of the ITO. However, when the opaque metal is applied to the flexible touch screen panel, the occurrence of cracks is decreased as compared with when the ITO is applied. Thus, the opaque metal can be easily applied to the flexible touch screen panel.

However, when the first sensing electrode 110 is formed of the opaque metal, light emitted in pixels 20 (see FIG. 2) has to pass through the first sensing electrode 110 and is reduced or blocked by the first sensing electrode 110, and therefore, the image quality and visibility of the display device may be lowered.

Figure 2:
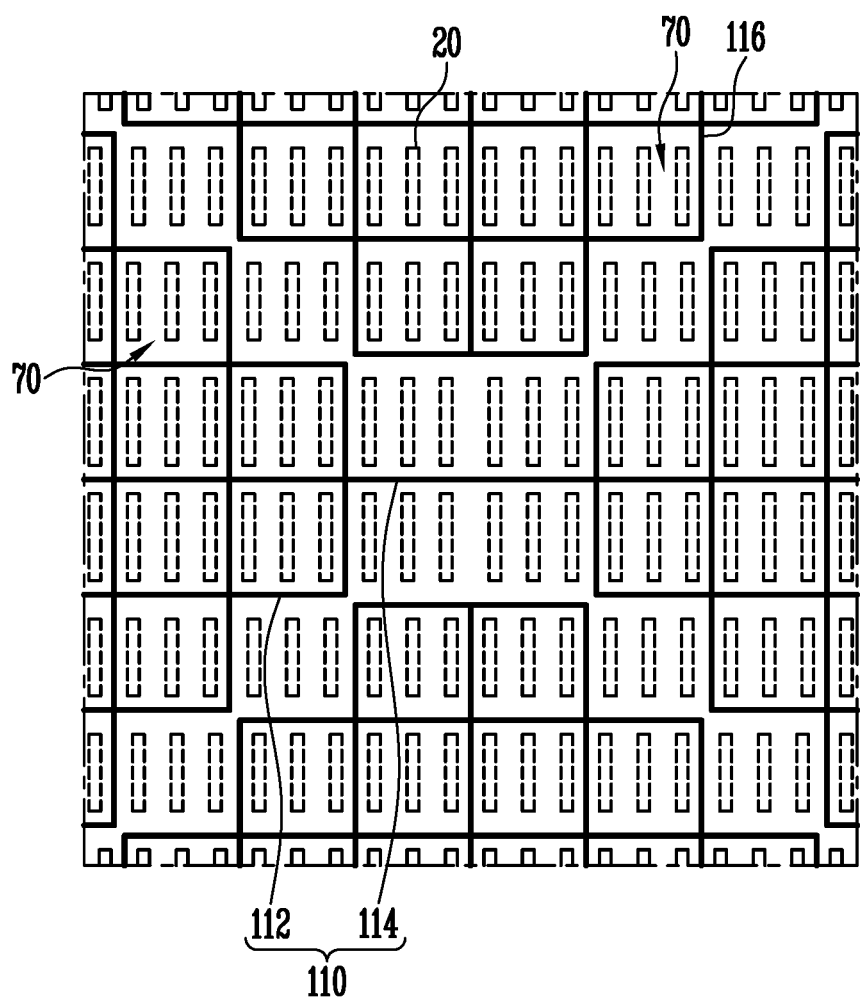
FIG. 2 is a schematic plan view (main-portion enlarged view) showing first sensing electrodes and first dummy patterns shown in FIG. 1.

Accordingly, in the present embodiment, the first sensing electrode 110 and the first dummy pattern 116 are formed in a mesh shape so as not to overlap with the pixels 20 as shown in FIGS. 1 and 2.

FIG. 2 is a schematic plan view (main-portion enlarged view) showing the first sensing electrodes 110 and the first dummy patterns 116 shown in FIG. 1. Particularly, a plurality of pixels 20 positioned below the first sensing electrodes 110 and the first dummy patterns 116 are additionally shown in FIG. 2. Here, the plurality of pixels 20 are formed on the lower substrate of the organic light emitting display device.

Here, the first sensing electrode 110 may include a plurality of first sensing cells 112 arranged along the first direction, and first connection patterns 114 configured to electrically connect the first sensing cells 112 to each other.

Although it has been described in the embodiment of FIG. 2 that the first connection pattern 114 is formed as one line, the first connection pattern 114 may be formed as a plurality of lines.

This is provided for the purpose of adjusting the capacitance between the first sensing electrode 110 and a second sensing electrode 120 disposed to cross the first sensing electrode 110.

The second sensing electrode 120 may include a plurality of second sensing cells 122 arranged along the second direction and second connection patterns 124 configured to electrically connect the second sensing cells 122 to each other. As shown in FIG. 1, the first connection pattern 114 of the first sensing electrode 110 crosses the second connection pattern 124 of the second sensing electrode 120.

That is, capacitance is formed between the first and second connection patterns 114 and 124 crossing each other. Here, the capacitance can be adjusted by forming the first connection pattern 114 as one line or a plurality of lines.

Referring to FIG. 2, the first sensing cell 112 and the first dummy pattern 116 according to this embodiment may be formed in a mesh shape through metal lines that form a plurality of openings 70 so as not to overlap with the pixels 20.

That is, the metal lines (surrounding and exposing the openings 70) allow the pixels 20 to be exposed through the plurality of openings 70, so that light emitted from the pixels 20 is not reduced or blocked by the first sensing electrodes 110 and the first dummy patterns 116 but can be provided to the outside of the display device.

Here, the first sensing electrodes 110 and the first dummy patterns 116 may be positioned to overlap with a non-emission area of the lower substrate of the organic light emitting device in which the pixels 20 do not exist.

For example, the pixels 20 may be spaced apart from each other at a set or predetermined distance. Here, metal lines constituting the first sensing electrodes 110 and the first dummy patterns 116 may be positioned in the space (area) between the pixels 20.

In order to prevent the visibility of the touch screen panel from being lowered due to the overlapping of the emission area of the pixels 20 with the metal lines constituting the first sensing electrodes 110 and the first dummy patterns 116, the width of the metal line is, in one embodiment, set to be narrower than the distance between the pixels 20.

Although it has been illustrated in FIG. 2 that the opening 70 existing in the first sensing cell 112 and the first dummy pattern 116 is formed to correspond to three pixels 20, this is merely one embodiment. That is, the opening 70 may be formed to correspond to only one pixel 20 or to at least one pixel 20.

When the opening 70 existing in the first sensing cell 112 and the first dummy pattern 116 is formed to correspond to three pixels 20, the three pixels 20 are, in one embodiment, set as red, green and blue pixels.

In the embodiment shown in FIGS. 1 and 2, the case where the first sensing cell 112 is formed in a rhombic shape has been described as an example. In more detail, for example, each first sensing cell 112 includes a plurality of rectangular-shaped (e.g., square-shaped) units. Each unit has four sides formed of the metal lines and openings defined by the four sides to expose the pixels 20 thereunder. All the units of each first sensing cell 112 form into the mesh shape which has an overall rhombic shape, for example, with two units in a first row, four units in a second row, six units in a third row, eight units in a fourth and fifth row each, six units in a sixth row, four units in a seventh row, and two units in a eighth row. A connection pattern formed of the metal lines with the length of two units in the first direction connects two neighboring rhombic shaped first sensing cells 112 along the interface of the third row and the fourth row of the rhombic shape. However, the mesh-shaped metal lines arranged in the area between the pixels 20 may be divided into groups in the first direction to be used as the first sensing electrodes.

Here, the divided first sensing electrodes are electrically insulated from each other. When the first sensing electrodes are formed in such a shape, the first dummy patterns are not formed.

Figure 3:
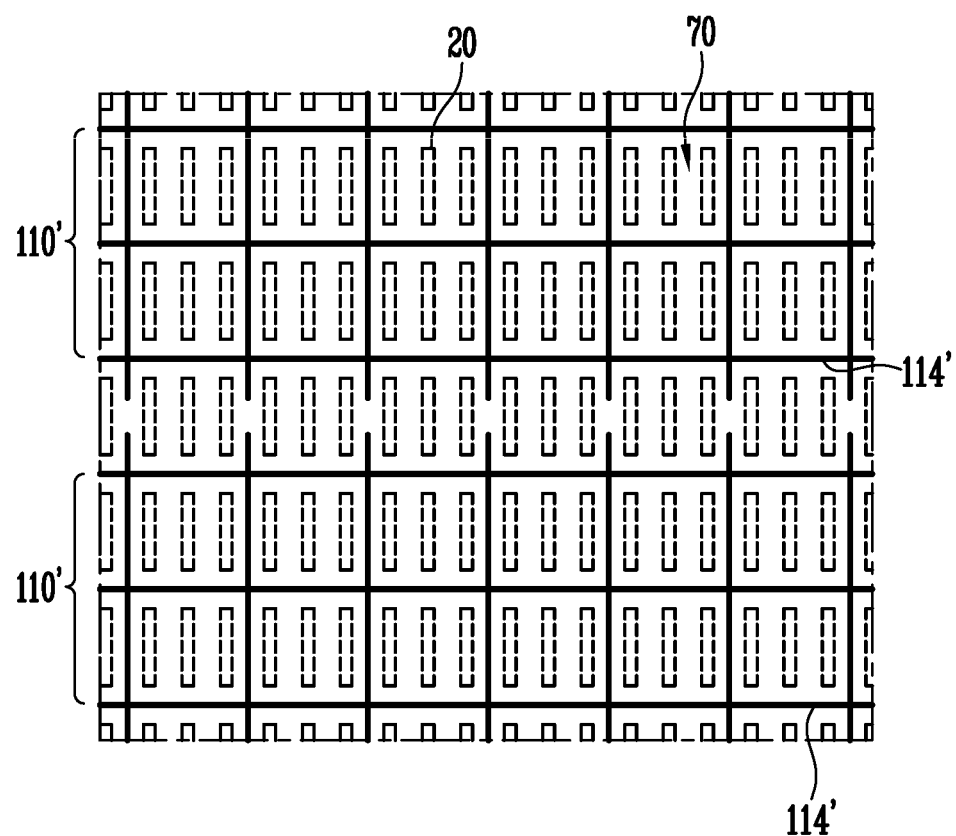
FIG. 3 is a schematic plan view (main-portion enlarged view) showing first sensing electrodes according to another embodiment of the present invention.

FIG. 3 is a schematic plan view (main-portion enlarged view) showing first sensing electrodes according to another embodiment of the present invention. The first sensing electrodes 110' are configured by dividing the mesh-shaped metal lines 114' arranged (extending) in the first direction into groups in the second direction (e.g., a group or a number of metal lines 114' extending in the first direction are connected to one another and forms a first sensing electrode 110'. Neighboring first sensing electrodes 110' arranged in the second direction crossing the first direction are not connected with each other in the second direction).

Here, like the embodiment shown in FIG. 2, the mesh-shaped metal lines allow the pixels 20 to be exposed through the plurality of openings 70, so that light emitted from the pixels 20 is not reduced or blocked by the first sensing electrodes 110' but can be provided to the outside of the display device.

The divided first sensing electrodes 110' are electrically insulated from each other. When the first sensing electrodes 110' are formed in such a shape, the first dummy patterns of the embodiment shown in FIG. 2 are not formed.

In the embodiment of FIG. 3, the case where each first sensing electrode 110' includes three metal lines 114' arranged in the first direction has been described as an example. However, the number of the metal lines 114' in the first direction, which constitute the first sensing electrode 110', is not limited thereto.

Here, the metal lines 114' arranged in the first direction perform the same function as the first connection pattern 114 of the embodiment shown in FIG. 2.

That is, the number of the metal lines 114' extending in the first direction as the first connection pattern may be adjusted in order to adjust the capacitance between the first sensing electrode 110' and the second sensing electrode 120 disposed to cross the first sensing electrode 110'.

The second sensing electrode may include a plurality of second sensing cells 122 arranged along the second direction, and second connection patterns 124 configured to electrically connect the second sensing cells 122 to each other. The metal lines 114' in the first direction cross the second connection patterns 124 of the second sensing electrode 120, corresponding thereto.

That is, capacitance is formed between the metal lines 114' in the first direction and the second connection pattern 124, which cross each other. Here, the capacitance can be adjusted by selecting the number of the metal lines 114' in the first direction.

Referring back to FIG. 1, a first dielectric layer 130 is formed on the first sensing electrodes 110 and the first dummy patterns 116.

Suitable material for the first dielectric layer 130 may include a compound of any one or more material selected from $SiO_2$, $TiO_2$, $ZrO_2$, $Ta_2O_5$, $HfO_2$, $Al_2O_3$, ZnO, $Y_2O_3$, BeO, MgO, $PbO_2$, $WO_3$, VOx, SiNx, ENx, AlN, ZnS, CdS, SiC, SiCN, $MgF_2$, $CaF_2$, NaF, $BaF_2$, $PbF_2$, LiF, $LaF_3$, GaP, and a mixture thereof. However, the present invention is not limited thereto.

The plurality of second sensing electrodes 120 of the touch screen panel are formed on the first dielectric layer 130.

Figure 4A:
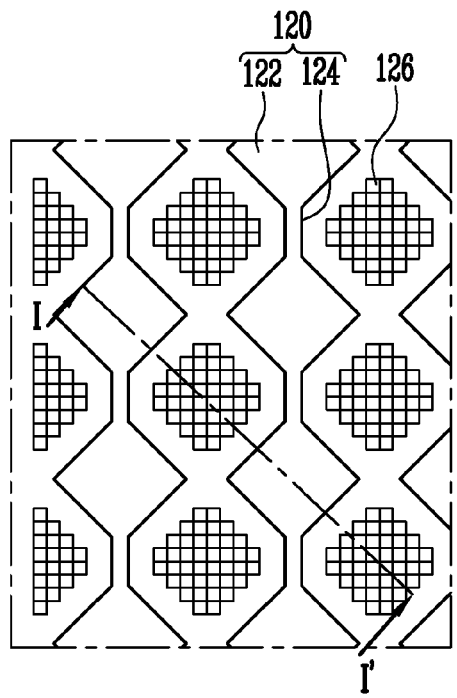
FIGS. 4A and 4B are schematic plan views (main-portion enlarged views) showing second sensing electrodes and second dummy patterns shown in FIG. 1, each according to an embodiment of the present invention.
Figure 4B:
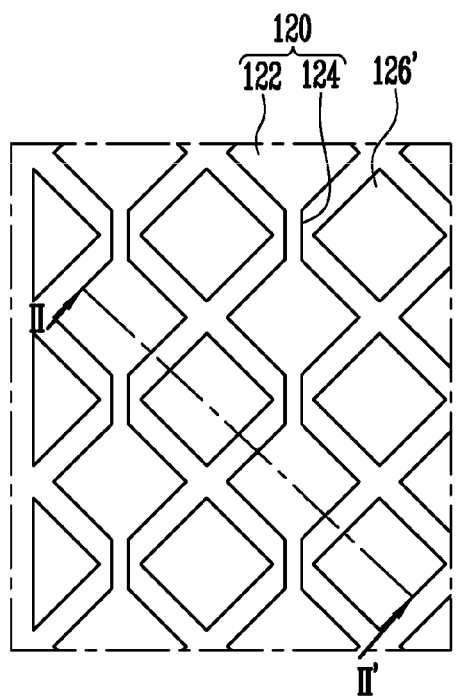

FIGS. 4A and 4B are schematic plan views (main-portion enlarged views) each showing an embodiment of the second sensing electrodes and second dummy patterns shown in FIG. 1.

Referring to FIGS. 1, 4A and 4B, the second sensing electrode 120 is formed along (elongated along) the second direction (e.g., the Y-axis direction), so that a plurality of second sensing electrodes 120 can be arranged (and spaced apart) along the first direction (e.g., the X-axis direction) crossing (or intersecting) the second direction.

The second sensing electrode 120 may include a plurality of second sensing cells 122 arranged along the second direction, and second connection patterns 124 configured to electrically connect the second sensing cells 122 to each other.

Here, the second sensing cell 122 may have a rhombic shape as shown in FIG. 1. However, the second sensing cell 122 may have various suitable shapes such as a circular shape or a polygonal shape.

In this embodiment, the case where the second sensing cell 122 is formed in a rhombic shape is described as an example. When the second sensing cell 122 is formed in the rhombic shape, an empty space occurs (exists) between adjacent second sensing cells 122 (e.g., an empty space surrounded by four adjacent second sensing cells 122).

Accordingly, in this embodiment, a plurality of second dummy patterns 126 are formed in the space between the adjacent second sensing cells 122. As shown in FIG. 1, the second dummy patterns 126 are formed in the same shape as the second sensing cells 122.

Here, the second dummy patterns 126 are not electrically connected to each other. That is, a connection pattern is not formed between the second dummy patterns 126, and therefore, the second dummy patterns 126 are spaced apart from each other at a set or predetermined interval.

Thus, the second sensing cells 122 and the plurality of second dummy patterns 126 (formed in the space between the second sensing cells 122) are formed in a regular pattern to be close to each other on the first dielectric layer 130.

As shown in FIG. 1, the second sensing cells 122 formed on the first dielectric layer 130 are formed at positions respectively overlapped with the plurality of first dummy patterns 116 formed on the upper substrate 100 of the display device, and the second dummy patterns 126 formed on the first dielectric layer 130 are formed at positions respectively overlapped with the plurality of first sensing cells 112 formed on the upper substrate 100 of the display device.

That is, when assuming that the first and second sensing cells 112 and 122 and the first and second dummy patterns 116 and 126 are all formed in the same rhombic shape, the second dummy pattern 126 corresponding to the first sensing cell 112 is formed above the first sensing cell 112 to overlap with the first sensing cell 112, and the second sensing cell 122 corresponding to the first dummy pattern 116 is formed above the first dummy pattern 116 to overlap with the first dummy pattern 116.

In this embodiment, the second sensing electrodes 120 and the second dummy patterns 126 may also be formed of the same opaque metal material as the first sensing electrodes 110 and the first dummy patterns 116.

However, unlike the first sensing electrode 110, the second sensing electrode 120 is formed in a filled surface shape (i.e., the material for the second sensing cells 122 completely fills the inside of each of the sensing cells) rather than the mesh shape with openings inside each of the sensing cells.

Here, light emitted in the pixels 20 formed on the lower substrate of the display device may be blocked by the second sensing electrodes 120. In this embodiment, in order to reduce or prevent such a problem, the second sensing electrode 120 is formed to a thickness in which the light can be transmitted therethrough.

That is, if the second sensing electrode 120 is formed to a thickness of 3 to 20 nm, the transmittance of the second sensing electrode 120 becomes about 40 to 60%, which approximates to that of a comparable (general) polarizing plate.

The second dummy pattern 126 may be formed in a mesh shape similar to that of the first dummy patterns 116 as shown in FIG. 4A, or the second dummy patterns 126' may be formed in a filled surface shape identical to that of the second sensing cell 122 as shown in FIG. 4B.

When the second dummy patterns 126' are formed in the filled surface shape as shown in FIG. 4B, the second dummy patterns 126' are electrically connected to the respective first sensing cells 112 formed in areas overlapped with the second dummy patterns 126'. Although not shown in FIG. 1, the connection between the second dummy pattern 126' and the first sensing cell 112 corresponding thereto may be performed by forming a via hole in each of the corresponding area of the first dielectric layer 130.

The surface-shaped (with no openings therein) second dummy patterns 126' are formed to a thickness of 3 to 20 nm so that light emitted in the pixels 20 is not blocked by the second dummy patterns 126'.

Hereinafter, the structure and operation of the touch screen panel according to the embodiments of FIGS. 4A and 4B will be described in more detail with reference to FIGS. 1, 5 and 6.

Referring to FIG. 1, a second dielectric layer 140 is formed on the second sensing electrodes 120 and the second dummy patterns 126. The material of the second dielectric layer 140 may be the same as that of the first dielectric layer 130.

In the touch screen panel according to this embodiment as described above, first position detecting lines may be respectively connected to one end of the first sensing electrodes 110, and second position detecting lines may be respectively connected to one end of the second sensing electrodes 120.

The first and second position detecting lines transmit a signal detected from each of the sensing electrodes 110 and 120 to an external touch driving circuit through a pad portion. The touch driving circuit receiving the signal through the first and second position detecting lines can detect a user's touch position.

The touch screen panel according to this embodiment, as shown in FIG. 1, is configured into a stacked structure of the first sensing electrodes 110 and the first dummy patterns 116, the first dielectric layer 130, the second sensing electrodes 120 and the second dummy patterns 126, and the second dielectric layer 140. The touch screen panel can perform a polarizing function through the stacked structure described above. That is, the stacked structure serves as a polarizing film layer.

More specifically, the first sensing electrodes 110 and the first dummy patterns 116, and the second sensing electrodes 120 and the second dummy patterns 126 are all formed of a metal material. The metal material has a property of absorbing a portion of light.

That is, the first sensing electrodes 110 and the first dummy patterns 116 serve as a first metal layer, and the second sensing electrodes 120 and the second dummy patterns 126 serve as a second metal layer. Therefore, when light is transmitted through at least one of the first and second metal layers, a portion of the light may be absorbed.

Thus, in the stacked structure of the touch screen panel according to this embodiment, it is possible to reduce the reflection of external light through destructive interference using the partially reflected light. Further, it is possible to absorb external light which is not completely offset through the destructive interference, using the light absorbing property when light is transmitted through at least one of the first and second metal layers.

The first and second dielectric layers 130 and 140 may perform a function of controlling the phase difference of light and correcting the phase of light. That is, the first and second dielectric layers 130 and 140 may perform a function of preventing the reflection of external light by offsetting the reflected external light, using optical destructive interference phenomenon. The optical destructive interference phenomenon refers to a phenomenon that when lights reflected on an interface have the same reflection amplitude while having a phase of about 180 degrees therebetween, the reflected lights are offset to (e.g., cancel) each other.

Thus, in the stacked structure of the touch screen panel according to this embodiment, light entering into the touch screen panel from outside of the touch screen panel is reduced or cancelled by the absorbing phenomenon of light in at least one of the first and second metal layers, thereby reducing the reflection of external light. Accordingly, the reflection of external light can be reduced without attaching a circular polarizing plate (as used in comparable devices) to the touch screen panel, so that it is possible to decrease the entire thickness of the display device and to improve the visibility of the display device even though the thickness of the display device is decreased.

Figure 5:
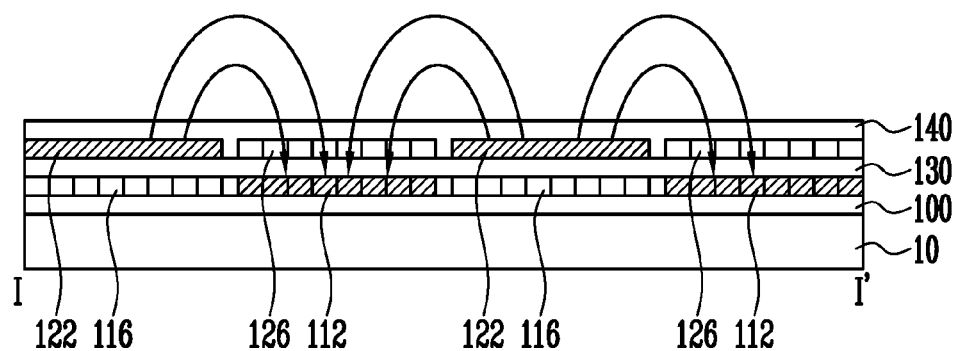
FIG. 5 is a sectional view showing one region of a display device integrated with a touch screen panel according to an embodiment of the present invention.

FIG. 5 is a sectional view showing one region of a display device integrated with a touch screen panel according to an embodiment of the present invention.

That is, FIG. 5 is a sectional view corresponding to one region (I-I') of FIG. 4A, which shows a stacked structure of a display device 10, first sensing cells 112 and first dummy patterns 116, formed on an upper substrate 100 of the display device, a first dielectric layer 130 formed on the first sensing cells 112 and the first dummy patterns 116, second sensing cells 122 and second dummy patterns 126, formed on the first dielectric layer 130, and a second dielectric layer 140 formed on the second sensing cells 122 and the second dummy patterns 126.

Here, the display device 10 may be an organic light emitting display device. The organic light emitting display device includes a lower substrate on which a plurality of pixels (20 of FIG. 2) are arranged, and an upper substrate 100 configured to seal the lower substrate. The upper substrate 100 may be formed of a glass material, or may be formed as a flexible thin film.

When the upper substrate 100 is formed as a thin film, the thin film may be formed into a structure in which at least one organic film layer and at least one inorganic film layer are sequentially stacked.

The first sensing cells 112 and the first dummy patterns 116, formed on the upper substrate 100, are formed of an opaque metal material. The first sensing cell 112 and the first dummy pattern 116 are formed in a mesh shape (with openings therein) so as not to overlap with the pixels 20 as shown in FIG. 2. The first sensing cell 112 is electrically connected to an adjacent first sensing cell 112 in the first direction (e.g., the X-axis direction) by a connection pattern (114 of FIG. 2).

The first dummy pattern 116 is formed in the area between the first sensing cells 112, and the shape of the first dummy pattern 116 is identical to that of the first sensing cell 112. However, the first dummy patterns 116 are not electrically connected to each other.

The second sensing cells 122 and the second dummy patterns 126, formed on the first dielectric layer 130, are also formed of an opaque metal material. The second sensing cell 122 is formed in a filled rhombic surface shape (with no openings therein) as shown in FIG. 4A. The second sensing cell 122 is electrically connected to an adjacent second sensing cell 122 in the second direction (e.g., the Y-axis direction) by a connection pattern (124 of FIG. 3).

The second dummy pattern 126 is formed in the area between the second sensing cells 122. The second dummy pattern 126 is formed in a mesh shape similar to that of the first dummy patterns 116. The second dummy patterns 126 are not electrically connected to each other.

Here, the surface-shaped second sensing cell 122 is formed to a thickness in which light emitted in the pixel (20 of FIG. 2) can be transmitted therethrough. That is, the second sensing cell 122 is formed to a thickness of 3 to 20 nm. Here, the transmittance of the second sensing cell 122 is about 40 to 60%.

As shown in FIG. 5, the second sensing cell 122 formed on the first dielectric layer 130 is formed at a position overlapped with the first dummy pattern 116 formed on the upper substrate 100 of the display device, and the second dummy pattern 126 formed on the first dielectric layer 130 is formed at a position overlapped with the first sensing cell 112 formed on the upper substrate 100 of the display device.

That is, when assuming that the first and second sensing cells 112 and 122 and the first and second dummy patterns 116 and 126 are all formed in the same rhombic shape, the second dummy pattern 126 corresponding to the first sensing cell 112 is formed above the first sensing cell 112 to overlap with the first sensing cell 112, and the second sensing cell 122 corresponding to the first dummy pattern 116 is formed above the first dummy pattern 116 to overlap with the first dummy pattern 116.

The touch screen panel according to this embodiment senses a change in capacitance when the intensity of an electric field between the first sensing cell 112 and the second sensing cell 122 adjacent thereto is changed by an object contacting the touch screen panel. In the embodiment shown in FIG. 5, the second dummy pattern 126 overlapped with the first sensing cell 112 is formed in the mesh shape, and thus the electric field between the second sensing cell 122 and the first sensing cell 112 adjacent thereto can be generated.

That is, the electric flux between the adjacent first and second sensing cells 112 and 122 is not blocked through the opening of the second dummy pattern 126 as shown in FIG. 5.

Figure 6:
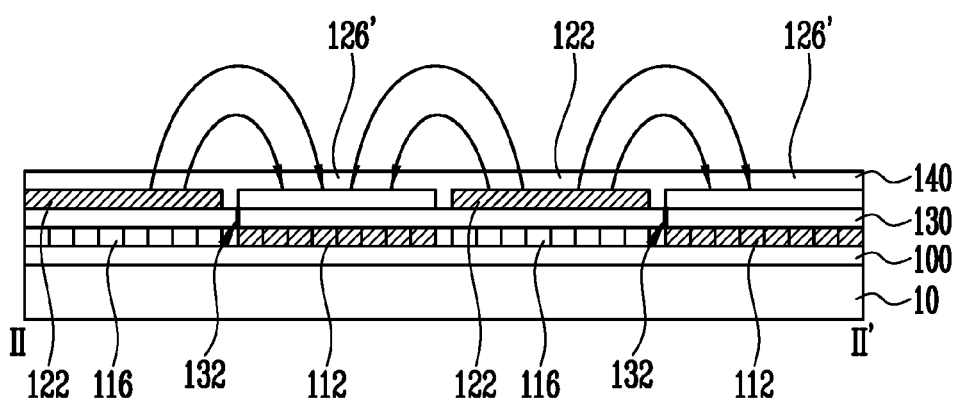
FIG. 6 is a sectional view showing one region of a display device integrated with a touch screen panel according to another embodiment of the present invention.

FIG. 6 is a sectional view showing one region of a display device integrated with a touch screen panel according to another embodiment of the present invention.

That is, FIG. 6 is a sectional view corresponding to one region (II-II') of FIG. 4B. The embodiment of FIG. 6 is different from that of FIG. 5 in that the second dummy pattern 126' is formed in a filled rhombic surface shape rather than the mesh shape (with openings therein).

Therefore, components identical to those of FIG. 5 are designated by like reference numerals, and their detailed descriptions will not be repeated.

Referring to FIG. 6, the second dummy patterns 126' formed on the first dielectric layer 130 are formed in a filled surface shape. The second dummy patterns 126' are electrically connected to the respective first sensing cells 112 formed in areas overlapped therewith. Here, the connection between the second dummy pattern 126' and the first sensing cell 112 corresponding thereto may be performed by forming a via hole 132 in a corresponding area of the first dielectric layer 130.

The touch screen panel according to this embodiment senses a change in capacitance when the intensity of an electric field between the first sensing cell 112 and the second sensing cell 122 adjacent thereto is changed by an object contacting with the touch screen panel. In the embodiment shown in FIG. 6, the first sensing cell 112 is electrically connected to the second dummy pattern 126' overlapped therewith, and therefore, the second dummy pattern 126' performs the same function as the first sensing cell 112 connected thereto. Thus, the electric field between the second sensing cell 122 and the second dummy pattern 126' adjacent thereto can be generated.

A touch screen panel can be substituted for a separate input device connected to an image display device, such as a keyboard or mouse, and its application fields have been gradually extended. Generally, such a touch screen panel is frequently commercialized by being attached to an outer face of the image display device such as a liquid crystal display device or organic light emitting display device.

In addition, a polarizing plate is attached to the outer surface of the image display device in order to improve external visibility by blocking the reflection of external light.

Here, the polarizing plate and the touch screen panel are manufactured through a process of separately manufacturing the polarizing plate and the touch screen panel and then attaching or assembling the polarizing plate and the touch screen panel. This results in an increase in the entire thickness of the touch screen panel, a decrease in process efficiency, a decrease in yield, etc.

As described above, according to embodiments of the present invention, a conductive pattern in a polarizing film layer formed on an upper surface of the display device is used as the sensing electrodes of a touch sensor, and the polarizing film layer is integrally formed with the display device, so that it is possible to decrease the thickness of the display device and to improve the visibility of an image.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singularly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims, and equivalents thereof.

What is claimed is:

1. A display device integrated with a touch screen panel, comprising:
   a plurality of pixels;
   a plurality of first sensing electrodes on an upper surface of the display device;
   a first dielectric layer on the plurality of first sensing electrodes;
   a plurality of second sensing electrodes on the first dielectric layer; and
   a plurality of second dummy patterns on the first dielectric layer, wherein the plurality of second sensing electrodes are arranged in a direction crossing the first sensing electrodes, and the plurality of second dummy patterns are formed not to overlap with the plurality of second sensing electrodes; and
   a second dielectric layer on the plurality of second sensing electrodes and the plurality of second dummy patterns,
   wherein the plurality of first sensing electrodes, the plurality of second sensing electrodes and the plurality of second dummy patterns each comprise a metal material,
   the plurality of first sensing electrodes are each formed to have a mesh shape including a plurality of openings surrounded by metal lines,
   the plurality of pixels are exposed through the plurality of openings, and
   the metal lines are placed not to overlap with the plurality of pixels.

2. The display device of claim 1, further comprising:
   a plurality of first dummy patterns on the upper surface of the display device not to overlap with the plurality of first sensing electrodes.

3. The display device of claim 1, wherein each of the plurality of first sensing electrodes comprises:
   a plurality of first sensing cells arranged along a first direction; and
   a plurality of first connection patterns configured to electrically connect the first sensing cells to each other.

4. The display device of claim 3, wherein:
   each of the plurality of first connection patterns comprises at least one metal line.

5. The display device of claim 3, wherein:
   the plurality of first sensing cells and a plurality of first dummy patterns between the plurality of first sensing cells are formed in a regular pattern to be close to each other.

6. The display device of claim 2, wherein:
   the plurality of first dummy patterns comprise a same metal material as the plurality of first sensing electrodes, and are each formed to have a mesh shape not to overlap with the plurality of pixels.

7. The display device of claim 1, wherein:
each of the plurality of second sensing electrodes comprises a plurality of second sensing cells arranged along a second direction crossing the first direction, and second connection patterns configured to electrically connect the second sensing cells to each other.

8. The display device of claim 7, wherein:
the plurality of second sensing cells are each formed to have a filled rhombic surface shape.

9. The display device of claim 7, wherein:
the plurality of second sensing cells and the plurality of second dummy patterns between the plurality of second sensing cells are formed in a regular pattern to be close to each other.

10. The display device of claim 1, wherein:
the second sensing electrodes has a transmittance of light emitted in the pixels of 40 to 60%.

11. The display device of claim 10, wherein:
a thickness of the second sensing electrode is 3 to 20 nm.

12. The display device of claim 1, wherein:
the plurality of second dummy patterns are each formed to have a mesh shape.

13. The display device of claim 1, wherein:
the plurality of second dummy patterns are each formed to have a filled rhombic surface shape.

14. The display device of claim 13, wherein:
the plurality of second dummy patterns are formed to a same thickness as the plurality of second sensing electrodes.

15. The display device of claim 13, wherein:
the plurality of second dummy patterns are electrically connected to respective said first sensing electrodes formed in areas overlapped therewith.

16. The display device of claim 15, wherein:
the plurality of first sensing electrodes are electrically connected to the plurality of second dummy patterns through a plurality of first sensing cells.

17. The display device of claim 16, wherein:
a second dummy pattern of the plurality of second dummy patterns and a corresponding first sensing cell of the plurality of first sensing cells are electrically connected through a via hole in a corresponding area of the first dielectric layer.

18. The display device of claim 1, wherein:
the display device is an organic light emitting display device.

19. The display device of claim 1, wherein:
the upper surface of the display device is the upper surface of a thin film on the plurality of pixels.

* * * * *